(12) United States Patent
Shibata et al.

(10) Patent No.: US 10,603,979 B2
(45) Date of Patent: Mar. 31, 2020

(54) AIR-CONDITIONING REGISTER

(71) Applicant: TOYODA GOSEI CO., LTD., Kiyosu-shi, Aichi-ken (JP)

(72) Inventors: Minoru Shibata, Kiyosu (JP); Kenji Asano, Nagaoya (JP); Etsuo Ozawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 134 days.

(21) Appl. No.: 15/994,347

(22) Filed: May 31, 2018

(65) Prior Publication Data

US 2019/0030982 A1 Jan. 31, 2019

(30) Foreign Application Priority Data

Jul. 26, 2017 (JP) ................................. 2017-144877

(51) Int. Cl.
  *B60H 1/00* (2006.01)
  *B60H 1/34* (2006.01)
  *B60K 35/00* (2006.01)
  *B62D 25/14* (2006.01)

(52) U.S. Cl.
  CPC ......... *B60H 1/0065* (2013.01); *B60H 1/3421* (2013.01); *B60H 1/3414* (2013.01); *B60H 2001/3471* (2013.01); *B60K 35/00* (2013.01); *B62D 25/142* (2013.01)

(58) Field of Classification Search
  CPC .......... B60H 2001/3471; B60H 1/0065; B60H 1/3421
  USPC .................. 362/23.22, 23; 454/152, 154, 155
  See application file for complete search history.

(56) References Cited

U.S. PATENT DOCUMENTS 7,195,363 B2 * 3/2007 Horoho .................. G01D 11/28
                                                     362/23.21
2016/0185289 A1 6/2016 Shibata et al.

FOREIGN PATENT DOCUMENTS

JP          3168276 U    6/2011
JP       2016120902 A    7/2016

* cited by examiner

*Primary Examiner* — Logan M Kraft
*Assistant Examiner* — Michelle D Myrick
(74) *Attorney, Agent, or Firm* — Posz Law Group, PLC

(57) ABSTRACT

An air-conditioning register includes an operation knob. The operation knob includes a knob body and a cap with its downstream end portion closed by a lens. The cap is made of a material softer than those of the knob body and the lens. The inner circumferential portion of the upstream end portion of the cap is pressed against the outer circumferential portion of the knob body with at least a part engaged with the outer circumferential portion of the knob body by a projection-recess relationship. The inner circumferential portion of the downstream end portion of the cap is pressed against the outer circumferential portion of the lens with at least a part engaged with the outer circumferential portion of the lens by a projection-recess relationship.

6 Claims, 10 Drawing Sheets

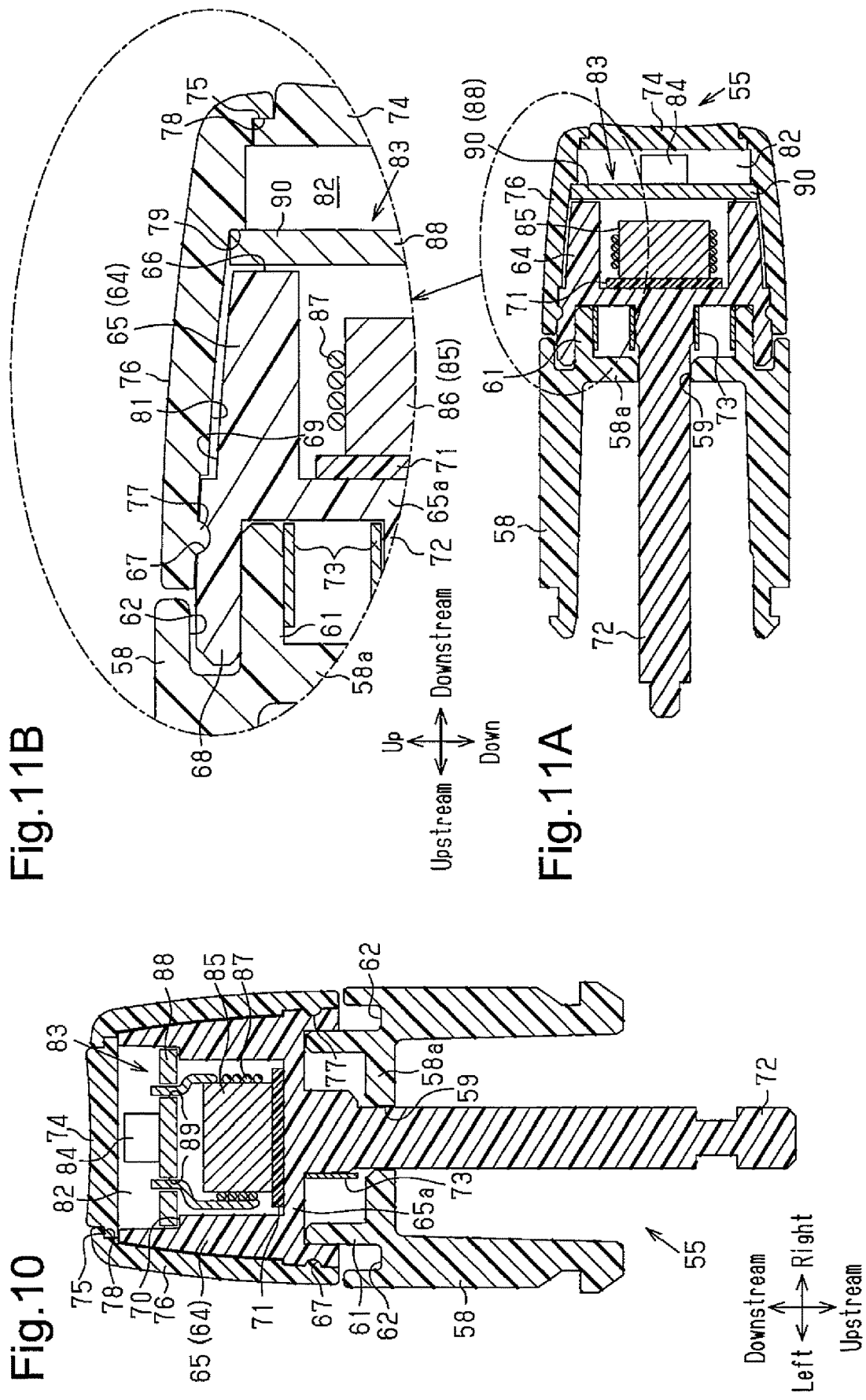

AIR-CONDITIONING REGISTER

BACKGROUND

The present disclosure relates to an air-conditioning register that blows out air-conditioning air, which is delivered from an air conditioner, through the outlet of an airflow passage.

Vehicles have air-conditioning registers that are installed in the instrument panel. The air-conditioning register blows out air-conditioning air, which is delivered from the air conditioner, through the outlet at the downstream end portion of the airflow passage. One example of such air-conditioning registers includes downstream fins, upstream fins, and a shut-off damper, which are arranged in the order from the outlet toward the upstream side in the flowing direction of the air-conditioning air. Such an air-conditioning register includes an operation knob, which is arranged at the outlet to operate the downstream fins, the upstream fins, and the shut-off damper.

To improve the visibility and design of air-conditioning registers, operation knobs with an illumination function have been considered. For example, Japanese Laid-Open Patent Publication No. 2016-120902 discloses an air-conditioning register that includes a light emitting portion and a power receiving portion connected to the light emitting portion, which are provided in the operation knob. The retainer of the air-conditioning register is provided with a power supplying portion, which wirelessly supplies power to the power receiving portion by the direct current resonance method.

This air-conditioning register wirelessly supplies power from the power supplying portion of the retainer to the power receiving portion of the operation knob, thereby causing the light emitting portion to emit light to illuminate the surroundings. This configuration requires neither feeder lines nor signal lines and thus has an improved aesthetic appearance. Unlike the case of wired connection, problems such as breakage of wires do not occur. The configuration also eliminates the necessity for routing feeder lines and signal lines to avoid breakage of the lines.

However, in the air-conditioning register disclosed in Japanese Laid-Open Patent Publication No. 2016-120902, the water vapor contained in the air-conditioning air flowing in the airflow passage condenses on the surface of the light emitting portion or the power receiving portion, which can cause corrosion, short circuits, and the like. Also, if sulfidizing gas contacts silver in the electronic components constituting the light emitting portion or the power receiving portion, the silver reacts with the sulfidizing gas. This may adversely affect the light emitting property of the light emitting portion.

SUMMARY

Accordingly, it is an objective of present disclosure to provide an air-conditioning register that enhances the airtightness of the operation knob with an illumination function.

To achieve the foregoing objective, an air-conditioning register includes a retainer, an operation knob, and a blow regulating portion. The retainer has an airflow passage, which has an outlet at the downstream end portion in the flowing direction of air-conditioning air. The operation knob is operably arranged at the outlet. The blow regulating portion is arranged in the airflow passage and operates in correspondence with operation of the operation knob, thereby regulating the state of the air-conditioning air, which is blown out from the outlet. The operation knob includes a light emitting portion and a power receiving portion, which is connected to the light emitting portion. The retainer includes a power supplying portion, which wirelessly supplies power to the power receiving portion. The operation knob further includes a knob body having a closed end and a cap. The downstream end portion in the flowing direction of the knob body is open. The upstream end portion in the flowing direction of the cap is open, and the downstream end portion of the cap is closed by a lens. The light emitting portion and the power receiving portion are arranged in an accommodation space surrounded by the knob body, the cap, and the lens. The cap is made of a material softer than those of the knob body and the lens. The inner circumferential portion of the upstream end portion of the cap is pressed against the outer circumferential portion of the knob body with at least a part engaged with the outer circumferential portion of the knob body by means of a projection-recess relationship. The inner circumferential portion of the downstream end portion of the cap is pressed against the outer circumferential portion of the lens with at least a part engaged with the outer circumferential portion of the lens by means of a projection-recess relationship.

BRIEF DESCRIPTION OF THE DRAWINGS

FIG. 10 is a cross-sectional view taken along line 10-10 of FIG. 9.

FIG. 11A is a cross-sectional view taken along line 11a-11a of FIG. 9.

FIG. 11B is an enlarged partial cross-sectional view showing a part of FIG. 11A.

DETAILED DESCRIPTION OF THE PREFERRED EMBODIMENTS

An air-conditioning register for a vehicle according to one embodiment will now be described with reference to FIGS. 1 to 14.

In the following description, the direction in which the vehicle advances (moves forward) will be referred to as the front, and the reverse direction will be referred to as the rear. The height direction of the vehicle will be referred to as a vertical direction of the vehicle. The width direction (the lateral direction) of the vehicle is defined with reference to the state in which the vehicle is viewed from the rear.

In the passenger compartment, the instrument panel is located in front of the front seats of the vehicle (the driver's seat and the front passenger seat). The instrument panel incorporates air-conditioning registers at the center and the sides with reference to the lateral direction. The main functions of the air-conditioning registers are to change the direction of air-conditioning air that is delivered from the air conditioner and blown through the outlets into the passenger compartment and to regulate the amount of blown air. Regulation of the blow amount includes stoppage of the air blow.

Figure 1:
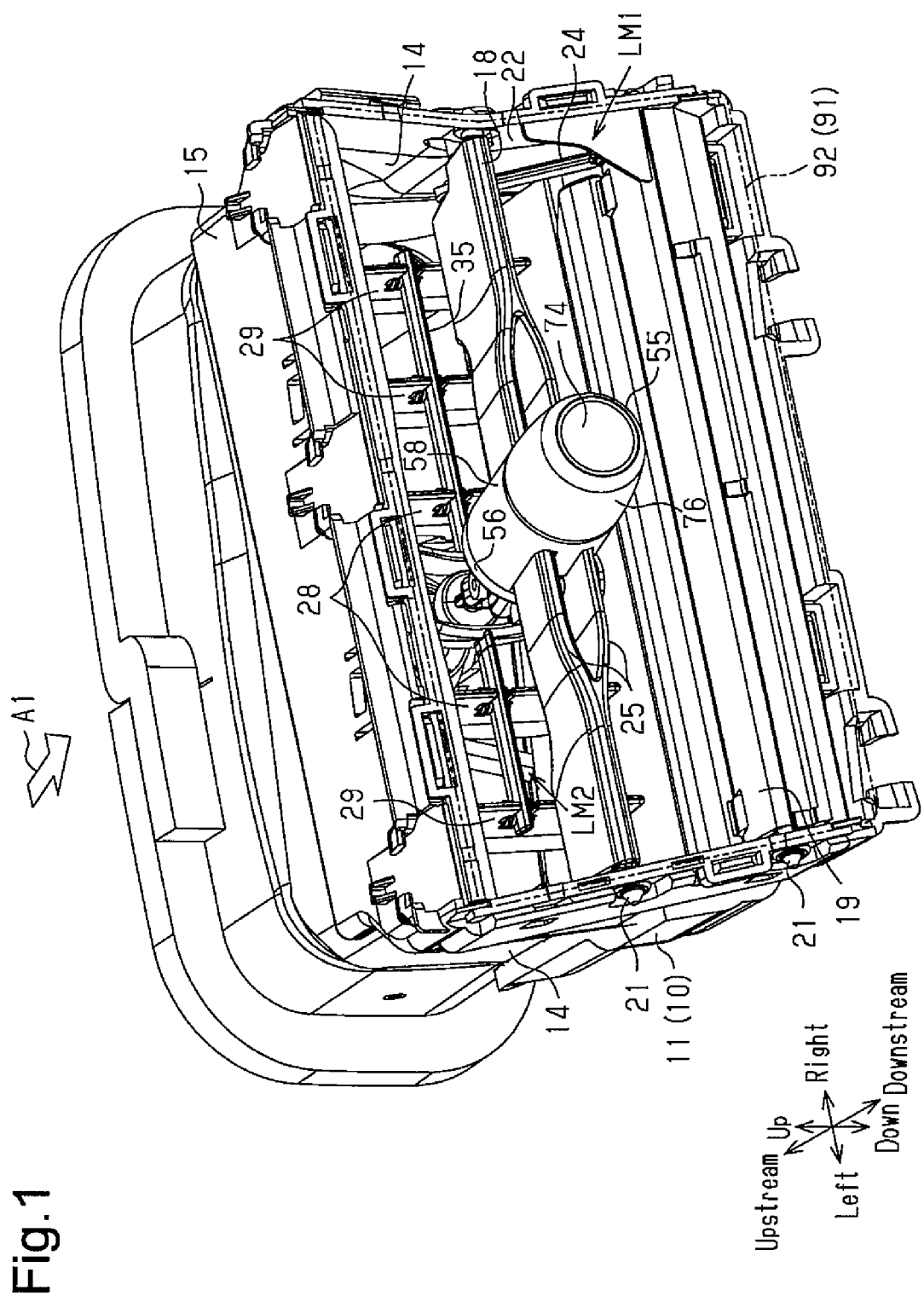
FIG. 1 is a perspective view of an air-conditioning register before a decorative panel is attached according to one embodiment.
Figure 5:
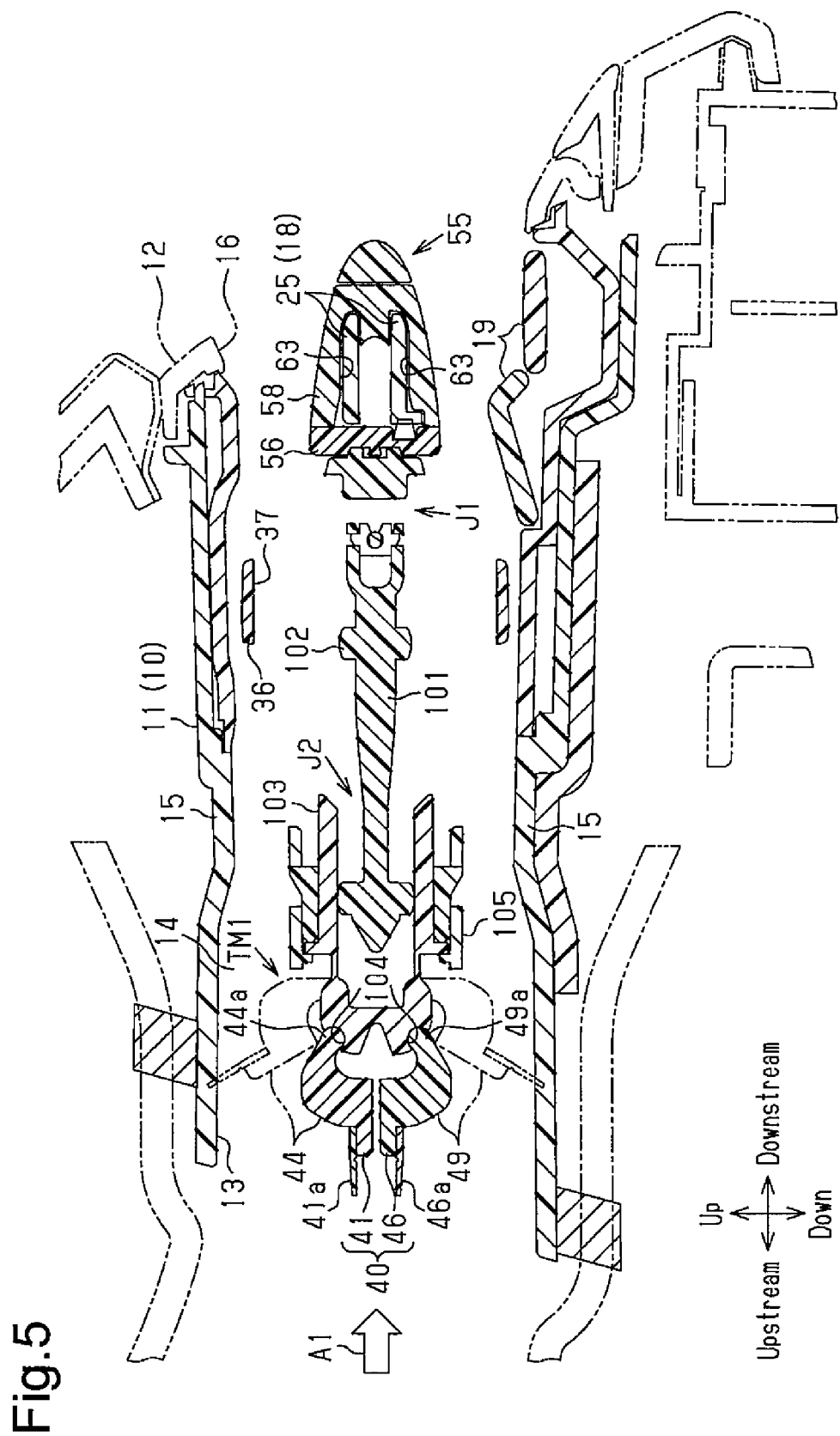
FIG. 5 is a cross-sectional side view showing the air-conditioning register of the embodiment.
Figure 6:
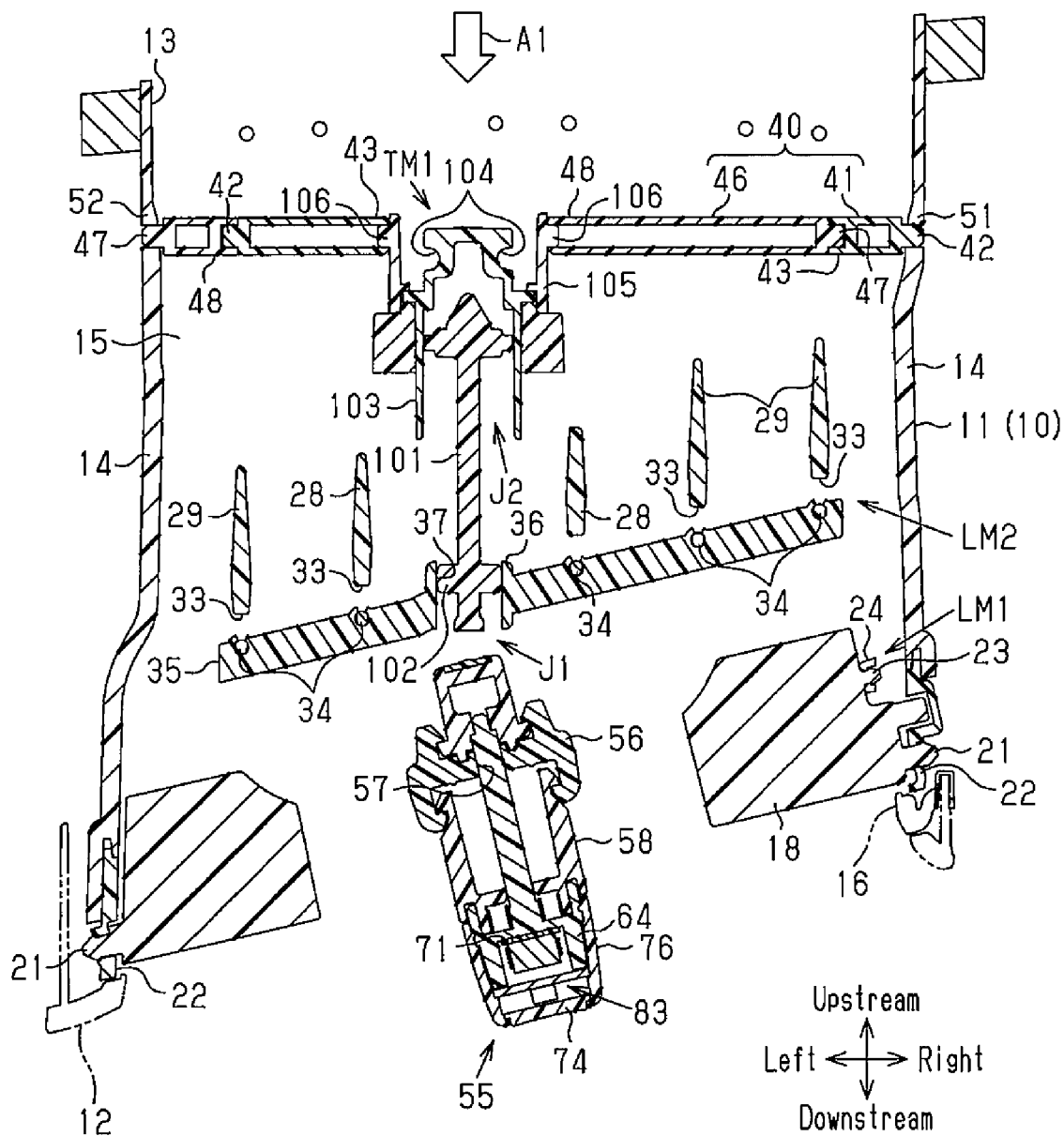
FIG. 6 is a cross-sectional plan view showing the air-conditioning register of the embodiment.

As shown in FIGS. 1, 5, and 6, the air-conditioning register includes a retainer 10, a blow regulating portion, and an operation knob 55. The blow regulating portion is configured to regulate the state of air-conditioning air A1, which is blown out from the air-conditioning register, and includes a downstream fin set, an upstream fin set, and a shut-off damper 40. FIG. 1 omits illustration of a decorative panel 12 such as a bezel on the retainer 10. The structure of each component constituting the air-conditioning register will now be described.

<Retainer 10>

The retainer 10 is configured to connect the duct (not shown) of the air conditioner to the opening (not shown) in the instrument panel. As shown in FIGS. 5 and 6, the retainer 10 includes a retainer body 11 and the decorative panel 12.

The interior space of the retainer 10 constitutes a passage for the air-conditioning air A1 (hereinafter, referred to as an airflow passage 13). With regard to the direction in which the air-conditioning air A1 flows, the side closer to the air conditioner will be referred to as the "upstream side," and the side farther from the air conditioner will be referred to as the "downstream side."

The airflow passage 13 is surrounded by the four walls of the retainer 10. The four walls include two vertical walls 14, which face each other in the lateral direction, and two lateral walls 15, which face each other in the vertical direction.

The decorative panel 12 constitutes the most downstream part of the retainer 10. The decorative panel 12 has an outlet 16 at the downstream end of the airflow passage 13. The air-conditioning air A1 is blown out through the outlet 16. The end face on the downstream side of the decorative panel 12 about the outlet 16 constitutes a part of a design surface of the air-conditioning register.

<Downstream Fin Set>

Figure 2:
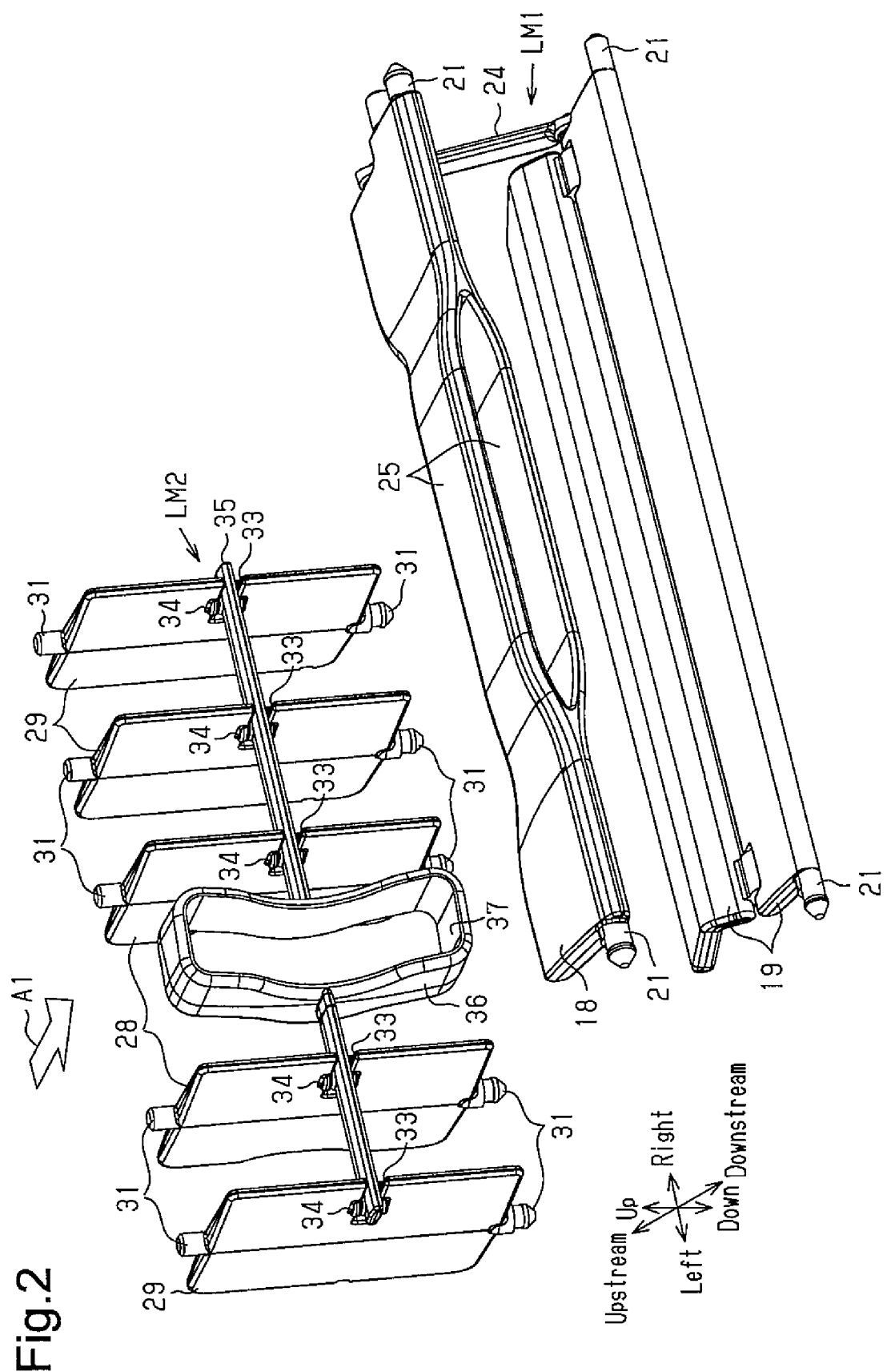
FIG. 2 is a perspective view showing some of the components of the blow regulating portion of the embodiment.

As shown in FIGS. 2 and 5, the downstream fin set includes multiple (two in the present embodiment) downstream fins 18, 19 arranged apart from each other in the vertical direction. The downstream fins 18, 19 are used to vertically change the direction in which the air-conditioning air Al is blown out through the outlet 16. The downstream fins 18, 19 are mainly constituted by plate-shaped members that extend in the lateral direction and the flowing direction of the air-conditioning air A1 in the airflow passage 13.

As shown in FIGS. 2 and 6, each of the downstream fins 18, 19 has downstream fin pivots 21 on the ends in the lateral direction. The downstream fin pivots 21 of the respective downstream fins 18, 19 are each supported by the corresponding vertical wall 14 with bearing portion 22.

Each of the downstream fins 18, 19 has a coupling pin 23 in a section displaced upstream from one (the right one) of the downstream fin pivots 21. The coupling pin 23 extends in parallel with the downstream fin pivot 21. The coupling pins 23 of the downstream fins 18, 19 are coupled together by a vertical coupling rod 24 extending substantially in the vertical direction. The coupling pins 23 and the vertical coupling rod 24 constitute a link mechanism LM1, which tilts the downstream fins 18, 19 in synchronization so that the downstream fins 18, 19 have the same inclination.

The upper downstream fin 18 has a tubular portion 25 at the middle section in the lateral direction. The upstream end portion and the downstream end portion of the tubular portion 25 are open (refer to FIG. 5). The tubular portion 25 has a flattened shape such that the lateral dimension is greater than the vertical dimension.

<Upstream Fin Set>

The upstream fin set is constituted by multiple upstream fins arranged on the upstream side of the downstream fin set in the airflow passage 13. The upstream fins are used to laterally change the direction in which the air-conditioning air A1 is blown out from the outlet 16. The upstream fins are constituted by plate-shaped members that extend in the vertical direction and the flowing direction in the airflow passage 13. Most of the upstream fins are arranged to be substantially parallel with each other, while being substantially equally separated in the lateral direction.

To distinguish the upstream fins, the adjacent two upstream fins at the center in the lateral direction will be referred to as central upstream fins 28, and the remaining ones will be referred to as upstream fins 29. When there is no need to distinguish the upstream fins, these will be collectively referred to as the upstream fins 28, 29 in some cases.

Each of the upstream fins 28, 29 has upstream fin pivots 31 at the ends in the vertical direction. The upstream fin pivots 31, which are provided on each of the upstream fins 28, 29, are tiltably supported by the corresponding lateral walls 15 with bearing portions (not shown). Each of the upstream fins 28, 29 has a cutout portion 33 and a coupling pin 34. Each coupling pin 34 extends in the vertical direction from the associated cutout portion 33 in a section displaced downstream from the upstream fin pivots 31. The coupling pins 34 of the upstream fins 28, 29 are coupled together by a lateral coupling rod 35 extending substantially in the lateral direction. The coupling pins 34 and the lateral coupling rod 35 constitute a link mechanism LM2, which tilts all the upstream fins 28, 29 in synchronization so that all the upstream fins 28, 29 have the same inclination.

<Shut-Off Damper 40>

Figure 4:
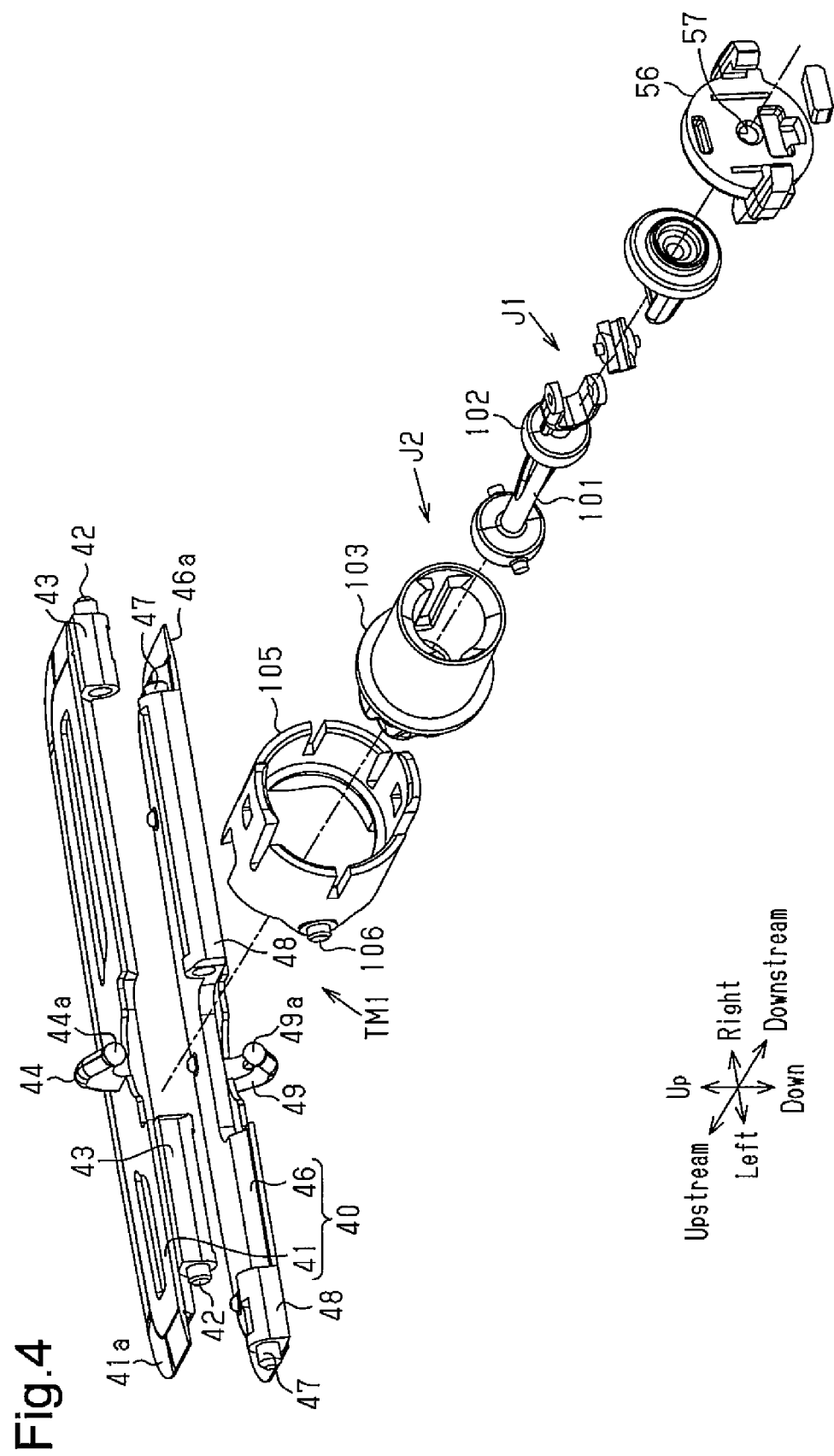
FIG. 4 is a perspective view showing some of the components of the air-conditioning register of the embodiment.

As shown in FIGS. 4 and 6, the shut-off damper 40 is located in the retainer 10 at a position upstream of the upstream fin set to selectively open and close the airflow passage 13. The shut-off damper 40 includes a pair of upper and lower damper plates 41, 46. The damper plates 41, 46 each have the shape of an elongated plate that is longer in the lateral direction than in the flowing direction. The damper plates 41, 46 respectively include flexible sealing members 41a, 46a provided at the periphery of the damper plates 41, 46. The sealing members 41a, 46a are thinner than the other sections of the damper plates 41, 46.

The upper damper plate 41 has damper pivots 42 at the opposite ends in the lateral direction. The upper damper plate 41 has two bearing portions 43 located between the damper pivots 42 and separated from each other in the lateral direction. The lower damper plate 46 has damper pivots 47 at the opposite ends in the lateral direction. The lower damper plate 46 has two bearing portions 48 located between the damper pivots 47 and separated from each other in the lateral direction.

The damper pivot 42 on the right end of the upper damper plate 41 is supported by the right vertical wall 14 with a bearing portion 51. The damper pivot 42 on the left end of the upper damper plate 41 is supported by the lower damper plate 46 with the bearing portion 48. The damper pivot 47 on the left end of the lower damper plate 46 is supported by the left vertical wall 14 with a bearing portion 52. The damper pivot 47 on the right end of the lower damper plate 46 is supported by the upper damper plate 41 with the bearing portion 43.

The damper plates 41, 46 are tiltable in the opposite directions between an open position and a closed position about the damper pivots 42, 47.

In the open position, the damper plates 41, 46 are substantially at the center between the lateral walls 15 as illustrated in the solid lines in FIG. 5. In this position, the damper plates 41, 46 are substantially parallel with the lateral walls 15 to largely open the airflow passage 13. The air-conditioning air A1 is divided into a stream above the damper plate 41 and a stream below the damper plate 46. After passing by the damper plates 41, 46, the air-conditioning air A1 flows along the upstream fin set and the downstream fin set and is then blown out from the outlet 16.

In the closed position, the damper plates 41, 46 are largely inclined relative to the lateral walls 15 as indicated by the long dashed double-short dashed lines in FIG. 5. In this state, the damper plates 41, 46 contact the lateral walls 15 to close the airflow passage 13. The flow of the air-conditioning air A1 is stopped in the section of the airflow passage 13 that is downstream of the damper plates 41, 46, so that the blow of the air-conditioning air A1 from the outlet 16 is stopped.

<Operation Knob 55>

As shown in FIGS. 1 and 4 to 6, the operation knob 55 is a member that is arranged at the outlet 16 to be manipulated by an occupant to operate the downstream fins 18, 19, the upstream fins 28, 29, and the shut-off damper 40, independently. The operation knob 55 includes a mounting base, a knob body 64, a lens 74, a cap 76, and an elastic member 71.

The mounting base has an upstream base member 56 and a downstream base member 58. The upstream base member 56 and the downstream base member 58 are arranged along the flowing direction and are coupled to each other by hook engagement or the like. The upstream base member 56 has a hole 57 at the center. The hole 57 is a through-hole extending in the flowing direction.

As shown in FIG. 10 and FIG. 11A, the downstream base member 58 has a substantially cylindrical shape with an open upstream end portion and a closed downstream end portion. The bottom portion 58a of the downstream base member 58 has a hole 59 at the center. The hole 59 is a through-hole extending in the flowing direction. The bottom portion 58a has a cylindrical portion 61, which is concentric with the hole 59 and protrudes toward the downstream side. The bottom portion 58a also has arcuate anti-rotation grooves 62, which are located outward of the cylindrical portion 61. The anti-rotation grooves 62 are separated in the circumferential direction and extend in the circumferential direction along the cylindrical portion 61.

Figure 7:
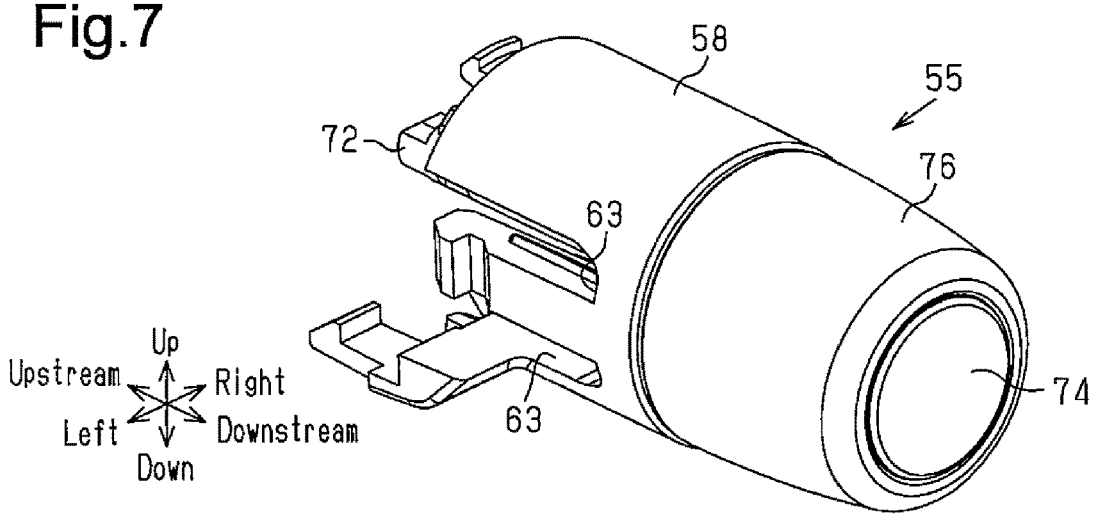
FIG. 7 is a perspective view showing some of the components of the operation knob of the embodiment.
Figure 8:
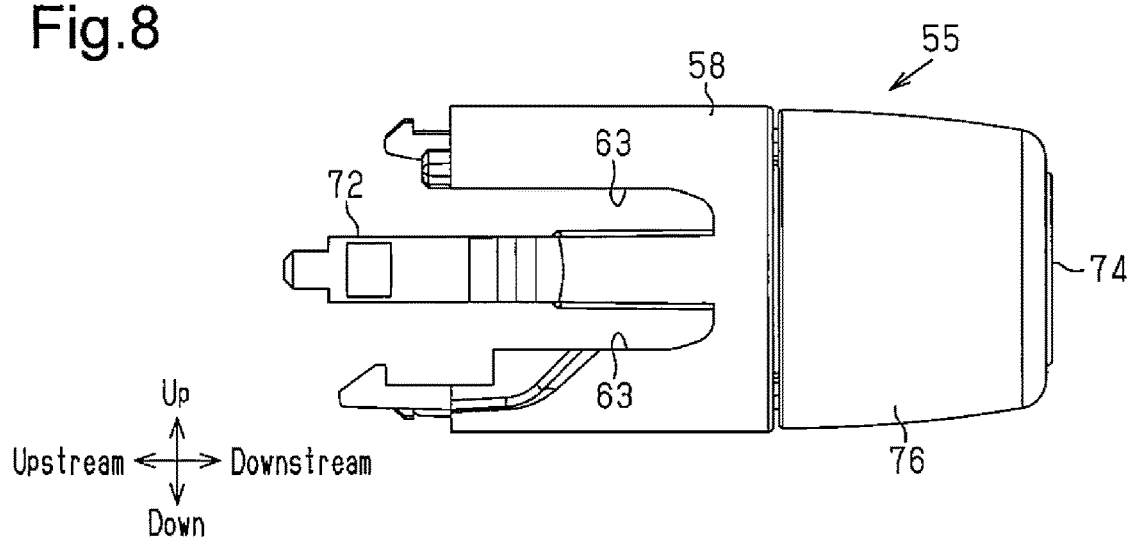
FIG. 8 is a side view showing some of the components of the operation knob of the embodiment.
Figure 9:
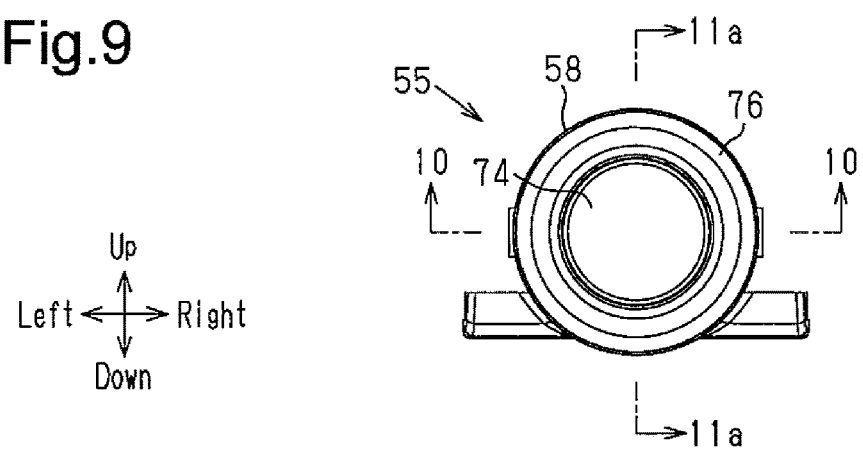
FIG. 9 is a front view showing some of the components of the operation knob of the embodiment.

As shown in FIGS. 7 to 9, the downstream base member 58 has a pair of upper and lower cutout portions 63 at each of the left and right portions. The cutout portions 63 extend from the upstream end face of the downstream base member 58 toward the downstream side. The downstream base member 58 is attached to the tubular portion 25 of the upper downstream fin 18 at the cutout portions 63 to be slidable in the lateral direction (see to FIG. 5).

As shown in FIGS. 3, 10, 11A, and 11B, the knob body 64 has a lens holding portion 65 and a shaft portion 72. The knob body 64 is entirely made of a hard plastic.

Figure 12:
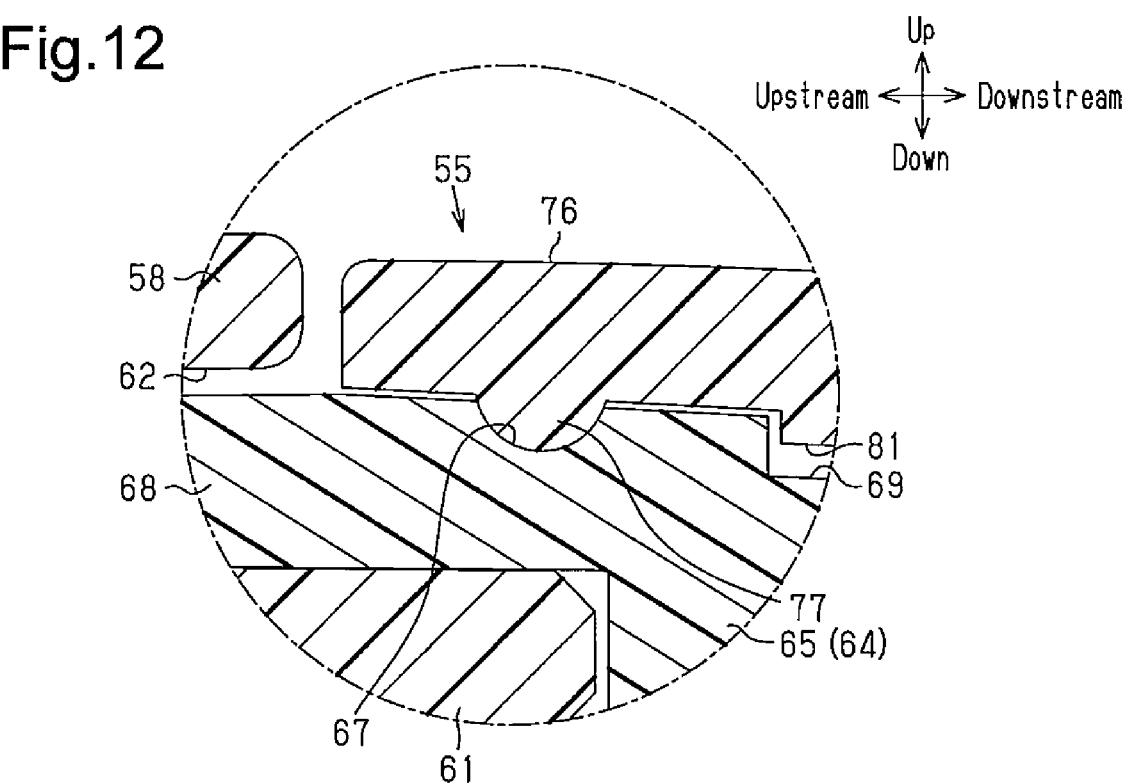
FIG. 12 is an enlarged partial cross-sectional side view illustrating part of the cap that is engaged with the knob body in the embodiment.

The lens holding portion 65 has a substantially cylindrical shape with an open downstream end portion in the flowing direction. The outer circumferential portion of the lens holding portion 65 gradually decreases in diameter toward the downstream side. The lens holding portion 65 has a bottom portion 65a at the middle section in the flowing direction. The lens holding portion 65 has anti-rotation grooves 66 at multiple (two) positions separated in the circumferential direction. The anti-rotation grooves 66 extend from the downstream end face toward the upstream side (see FIG. 11B). The lens holding portion 65 has an upstream engagement portion in the outer circumferential portion. In the present embodiment, the upstream engagement portion is constituted by an annular recess 67, which has a semicircular cross-sectional shape and extends over the entire circumference of the lens holding portion 65 as shown in FIG. 12. The lens holding portion 65 has stoppers 68 on the upstream end face at multiple (two) positions separated in the circumferential direction. The stoppers 68 extend toward the upstream side. Each stopper 68 is engaged with the corresponding anti-rotation groove 62 of the downstream base member 58. Each stopper 68 is movable in the circumferential direction only between the opposite ends in the circumferential direction of the corresponding anti-rotation groove 62. When each stopper 68 comes into contact with the end in the circumferential direction of the corresponding anti-rotation groove 62, further movement of the stopper 68 in the same direction is restricted. This restriction defines the rotational range of the knob body 64.

Figure 3:
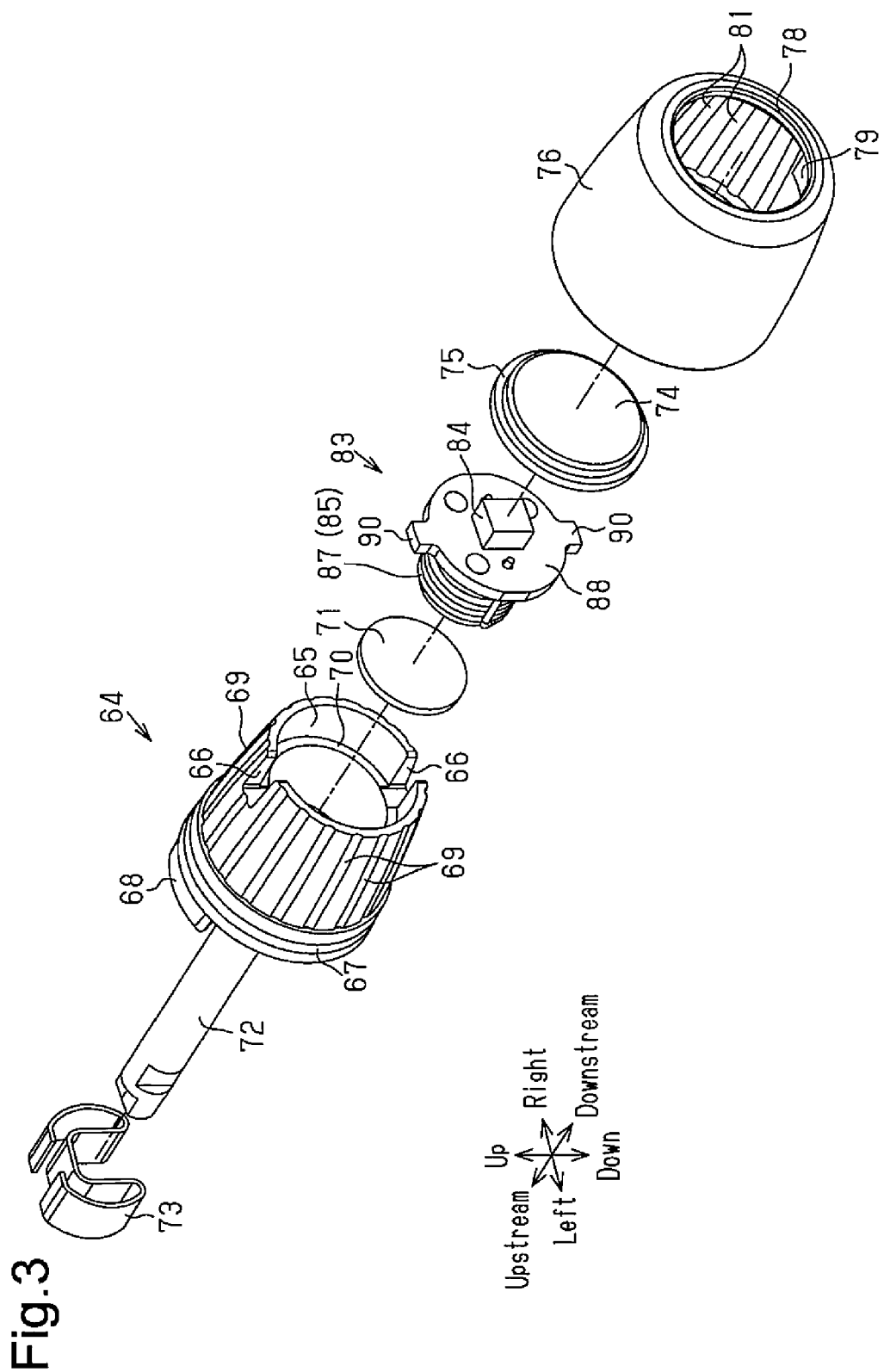
FIG. 3 is a perspective view showing some of the components of the operation knob of the embodiment.

As shown in FIGS. 3 and 11A, the lens holding portion 65 has anti-rotation grooves 69 on the outer circumferential surface at multiple positions separated in the circumferential direction. The anti-rotation grooves 69 extend in the flowing direction. As shown in FIGS. 3 and 10, the lens holding portion 65 has a securing step 70 in the inner circumferential portion at a position separated upstream from the downstream end face. Due to the securing step 70, the lens holding portion 65 has a larger inner diameter in the section downstream of the securing step 70 than in the section upstream of the securing step 70.

The shaft portion 72 extends upstream from the center portion of the bottom portion 65a of the lens holding portion 65. The shaft portion 72 is rotationally inserted into the hole 59 of the downstream base member 58 and the hole 57 (see FIG. 4) of the upstream base member 56 from the downstream side. The bottom portion 65a is close to the cylindrical portion 61 of the downstream base member 58 from the downstream side.

As shown in FIGS. 3, 11A and 11B, a shim 73 is arranged between the cylindrical portion 61 and the shaft portion 72. The shim 73 is formed by bending a leaf spring. The shim 73 elastically contacts the inner circumferential surface of the cylindrical portion 61 and the outer circumferential surface of the shaft portion 72. These contacts generate sliding resistance between the shim 73 and the shaft portion 72 when the operation knob 55 is rotated, which applies adequate load to the operation knob 55.

Like the knob body 64, the lens 74 is formed transparently of a hard plastic and has optical transparency. The lens 74 is arranged on the downstream side of the lens holding portion 65. The upstream section of the outer circumferential portion of the lens 74 has a larger diameter than the diameter of the downstream section. Due to the difference in outer diameter between the downstream section and the upstream section, the lens 74 has a stepped portion 75 in the outer circumferential portion. The stepped portion 75 serves as a downstream engagement portion. The stepped portion 75 is provided over the entire circumference of the lens 74.

The cap 76 is made of a material softer than those of the knob body 64 and the lens 74, for example, elastomer, rubber, or the like. The cap 76 has a substantially cylindrical shape with open upstream and downstream end portions. The cap 76 is gradually reduced in diameter from the upstream end to the downstream end. The cap 76 has an upstream engaging portion to be engaged with the annular recess 67 of the knob body 64 in the inner circumferential portion of the upstream end portion. The upstream engaging portion is constituted by an annular projection 77, which has a semicircular cross-sectional shape and extends over the entire circumference of the cap 76 (see FIG. 12). The downstream section in the downstream end portion of the inner circumferential portion of the cap 76 has a small diameter than the upstream section. Due to the difference in outer diameter between the downstream section and the upstream section, the cap 76 has a stepped portion 78 in the inner circumferential portion of the downstream end portion. The stepped portion 78 serves as a downstream engaging portion.

The cap 76 has multiple (two) securing steps 79 in the inner circumferential portion. The securing steps 79 are located upstream of and in the vicinity of the stepped portion 78. The securing steps 79 are separated from each other in the circumferential direction. The cap 76 has anti-rotation protrusions 81 in the inner circumferential portion between the annular projection 77 and the stepped portion 78. The anti-rotation protrusions 81 each extend in the flowing direction. The anti-rotation protrusions 81 are provided at positions separated from each other in the circumferential direction of the inner circumferential portion of the cap 76. The anti-rotation protrusions 81 are engaged with the anti-rotation grooves 69 of the knob body 64. This engagement attaches the cap 76 to the knob body 64 such that these rotate integrally.

The engagement of the annular projection 77 with the annular recess 67 causes the inner circumferential portion of the upstream end portion of the cap 76 to be pressed against the outer circumferential portion of the knob body 64 by means of the projection-recess relationship. Also, the engagement of the stepped portion 78 with the stepped portion 75 causes the inner circumferential portion of the downstream end portion of the cap 76 to be pressed against the outer circumferential portion of the lens 74 by means of the projection-recess relationship. The stepped portion 75 of the lens 74 is held by the lens holding portion 65 and the stepped portion 78 of the cap 76 from the opposite sides in the flowing direction. The lens 74 closes the downstream end portion of the cap 76. This engagement restricts the lens 74 from falling off the knob body 64.

The space surrounded by the knob body 64, the cap 76, and the lens 74 constitutes an accommodation space 82. A light emitting unit 83 is arranged in the accommodation space 82. The light emitting unit 83 is constituted by providing a light emitting portion 84 and a power receiving portion 85 on a wiring substrate 88. The wiring substrate 88 is shaped as a substantially circular plate. The wiring substrate 88 has stoppers 90, which project radially outward, at multiple (two) positions separated in the circumferential direction. Each stopper 90 is inserted into the corresponding anti-rotation groove 66 in the knob body 64. Further, the wiring substrate 88 is arranged between and held by the securing step 70 and the securing step 79 from the opposite sides in the flowing direction.

As the light emitting portion 84, a semiconductor device that emits light when receiving an electric current, for example, a light emitting diode (LED) is used. The light emitting portion 84 is arranged on the downstream side of the wiring substrate 88 and mounted on the wiring substrate 88 such that the light irradiation is directed toward the downstream side.

The power receiving portion 85 is provided with a ferrite core 86 and a loop coil 87. The ferrite core 86 and most of the loop coil 87 are arranged upstream of the substrate 88. The loop coil 87 constitutes a part of the power receiving-side resonance circuit and is wound around the ferrite core 86. The opposite ends of the loop coil 87 are inserted through through-holes 89 in the wiring substrate 88. A wiring pattern (not shown), which is electrically connected to the light emitting portion 84 and the electronic components, is provided on the downstream surface of the wiring substrate 88. The ends of the loop coil 87 inserted through the through-holes 89 are electrically connected to the wiring pattern by soldering or the like. The power receiving portion 85 is thus electrically connected to the light emitting portion 84 via the wiring pattern.

The elastic member 71 is made of an elastic material such as sponge. The elastic member 71 is arranged between the light emitting unit 83 and the bottom portion 65a of the knob body 64. The elastic member 71 urges the light emitting unit 83 toward the downstream side, so that the stoppers 90 of the wiring substrate 88 are pressed against the securing steps 79 of the cap 76. This pressing suppresses chattering of the light emitting unit 83 in the accommodation space 82.

Figure 13:
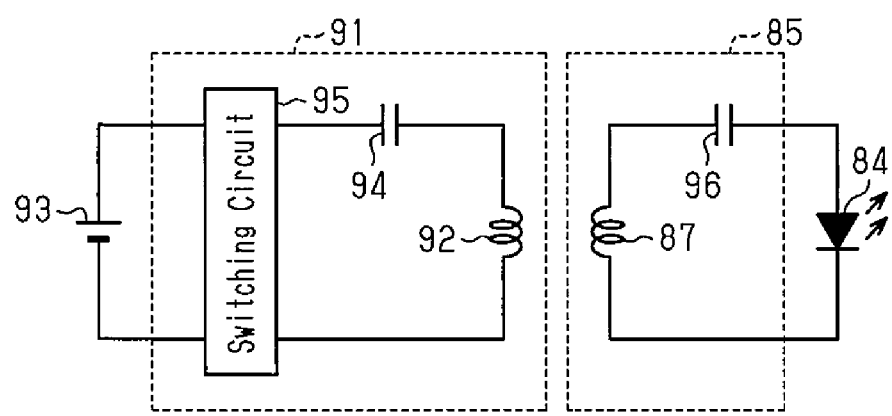
FIG. 13 is a circuit diagram of a wireless power supplying system of a direct current resonance method in the embodiment.

On the other hand, the retainer 10, for example, the decorative panel 12, is provided with a power supplying portion 91 indicated by the long dashed double-short dashed lines in FIG. 1. As shown in FIGS. 1 and 13, the power supplying portion 91 is provided with a loop coil 92, which constitutes a part of the power supplying-side resonance circuit. The loop coil 92 is provided to surround the outlet 16. The loop coil 92 wirelessly supplies power to the power receiving portion 85 incorporated in the operation knob 55 by the direct current resonance method. The power supplying portion 91 and the power receiving portion 85 are located within the range in which power supply is possible.

In the wireless power supplying system of the present embodiment, the direct current resonance method is adopted. In this method, a direct-current voltage generates an electromagnetic resonance field, which changes with time at a resonance frequency to cause the power supplying-side resonance circuit and the power receiving-side resonance circuit to resonate with each other, so that power is supplied across space. Specifically, the power supplying portion 91 constitutes a resonance circuit by connecting the power supplying-side loop coil 92 and a capacitor 94 in series to a vehicle battery 93, which is a direct-current power supply. Further, the power supplying portion 91 includes a switching circuit 95, which performs high-speed switching operation. The power supplying-side loop coil 92 is a one-turn coil having a simplified structure. In response to high-speed switching, the switching circuit 95 performs zero voltage switching (ZVS) to reduce power loss such as switching loss and suppress electromagnetic noise. The power receiving portion 85 constitutes a resonance circuit in which the power receiving-side loop coil 87 and a capacitor 96 are connected in series to the light emitting portion 84.

In the wireless power supplying system of the direct current resonance method, a resonance field, which changes with time, is directly generated from a direct-current power source such as the vehicle battery 93, so that power is supplied across the space by causing the resonance circuits on the power supplying side and the power receiving side to resonate with each other. In the direct current resonance method, energy conversion is directly performed from a direct-current power source. Thus, the energy conversion efficiency and the power supply efficiency are high.

Figure 14:
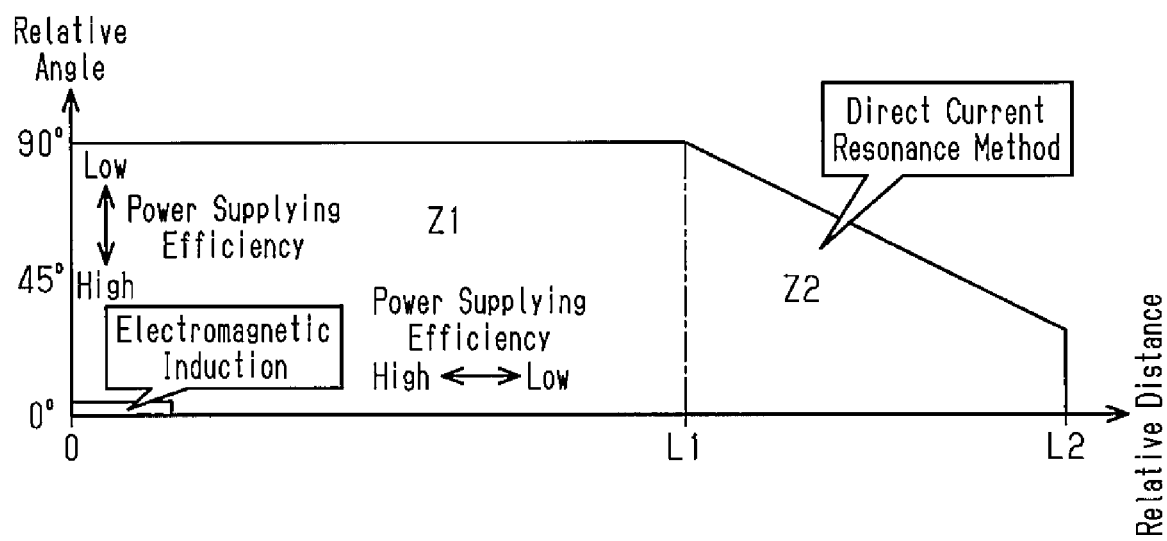
FIG. 14 is a diagram showing a relationship of the power supply efficiency with a relative distance and a relative angle in the direct current resonance method.

FIG. 14 shows the region in which the light emitting portion 84 in the present embodiment can emit light, in relation to the relative distance and the relative angle between the power supplying portion 91 and the power receiving portion 85. In this region, the longer the relative distance, the lower the power supply efficiency becomes. Also, the larger the relative angle, the lower the power supply efficiency becomes.

As shown in the same FIG. 14, regarding the relative distance between the power supplying portion 91 and the power receiving portion 85, the maximum value of the distance at which light can be emitted is in a range from a few millimeters to approximately one centimeter by the electromagnetic induction method in conformity with the Qi standard. In contrast, the maximum value of the relative distance at which light can be emitted by the direct current resonance method is approximately in a range from 10 cm to 20 cm.

In the electromagnetic induction method in conformity with the Qi standard, the maximum angle defined by the power supplying portion 91 and the power receiving portion 85 at which light can be emitted is substantially 0 degrees, which is significantly small. In contrast, the maximum value of the angle defined by the power supplying portion 91 and the power receiving portion 85 at which light can be emitted by the direct current resonance method is approximately 90 degrees. This allows the power supplying portion 91 and the power receiving portion 85 to be arranged highly flexibly.

In the region in which light can be emitted, the influence of changes in power supply efficiency on the luminance of the light emitting portion 84 is small in a region Z1, in which the relative distance is less than or equal to L1. In contrast, the influence of changes in power supply efficiency on the luminance of the light emitting portion 84 is great in a region Z2, in which the distance is greater than L1 and less than or equal to L2 (L2>L1). In the region Z2, the luminance is lowered as the power supply efficiency decreases due to increase in the relative distance. The region Z2 is a gradual reduction region of the direct current resonance method. In the region Z2 (gradual reduction region), the luminance of the light emitting portion 84 can be changed by changing the relative distance and the relative angle.

In the present embodiment, in order to transmit movement of the operation knob 55 to the central upstream fins 28 and the shut-off damper 40 and to tilt these as shown in FIGS. 2 and 6, the following configurations are employed.

A rectangular frame-shaped transmission portion 36 is provided in a section of the lateral coupling rod 35 between the central upstream fins 28. The transmission portion 36 includes a transmission hole 37, which extends in the flowing direction. As shown in FIGS. 4 to 6, a transmission shaft 101, which extends in the flowing direction, is inserted in the transmission portion 36. The transmission shaft 101 has a contactor 102 in the part that is inserted in the transmission hole 37.

A rotation direction converting mechanism TM1 is provided between the transmission shaft 101 and the damper plates 41, 46. The rotation direction converting mechanism TM1 changes the direction of rotation of the operation knob 55 transmitted through the transmission shaft 101 and transmits the rotation to the damper plates 41, 46. The rotation direction converting mechanism TM1 includes an arm portion 44, which extends downstream from the upper damper plate 41, an arm portion 49, which extends downstream from the lower damper plate 46, and a cam member 103.

The upper arm portion 44 curves to bulge upward. The arm portion 44 has at the downstream end portion a sliding end portion 44a having a spherical surface. The lower arm portion 49 curves to bulge downward. The arm portion 49 has at the downstream end portion a sliding end portion 49a having a spherical surface.

An outer cylinder member 105 is used to support the cam member 103 with the damper plates 41, 46. The outer cylinder member 105 includes a pair of pivots 106, which extend in the lateral direction. The pivots 106 allow the outer cylinder member 105 to be supported by the damper plates 41, 46. That is, the left pivot 106 is supported by the bearing portion 43, and the right pivot 106 is supported by the bearing portion 48.

The cam member 103 is rotationally attached to the outer cylinder member 105. The cam member 103 has a cam groove 104 on the outer surface. The sliding end portions 44a, 49a are slidably engaged with the cam groove 104.

The downstream end portion of the transmission shaft 101 is coupled to the knob body 64 with a downstream-side Cardan joint J1 to be capable of bending and transmitting rotation. In the present embodiment, a universal joint is used as the Cardan joint J1. The upstream end portion of the transmission shaft 101 is coupled to the cam member 103 with an upstream-side Cardan joint J2 to be capable of bending and transmitting rotation.

An operation and advantages of the above-described embodiment will now be described.

When the shut-off damper 40 is switched from the closed position to the open position or from the open position to the closed position, the cap 76 of the operation knob 55 is pinched and rotated as shown in FIGS. 10, 11A, and 11B. As the cap 76 is rotated, the knob body 64 is rotated integrally with the cap 76 and the light emitting unit 83 with respect to the downstream base member 58 and the upstream base member 56. In addition, each stopper 68 moves in the circumferential direction in the anti-rotation groove 62. As shown in FIGS. 5 and 6, the rotation is transmitted to the cam member 103 via the downstream-side Cardan joint J1, the transmission shaft 101, and the upstream-side Cardan joint J2. When the cam member 103 rotates, the positions at which the sliding end portions 44a, 49a of the arm portions 44, 49 engage with the cam groove 104 change, accordingly. With the changes in the engagement positions, the damper plates 41, 46 are tilted in the opposite directions from each other about the damper pivots 42, 47 between the open position and the closed position. The tilting action changes the opening degree of the airflow passage 13. This regulates the amount of the air-conditioning air A1 passing through the shut-off damper 40 in the airflow passage 13. When each stopper 68 moves to the end in the circumferential direction of the anti-rotation groove 62, further rotation of the cap 76 is restricted.

When the transmission shaft 101 is rotated as described above, the rotation is not transmitted to the upstream fins 28, 29. This is because the contactor 102 rotates in the transmission hole 37 as the transmission shaft 101 rotates, so that no force is transmitted between the contactor 102 and the transmission portion 36. Thus, the upstream fins 28, 29 are not tilted. Also, no force is transmitted between the operation knob 55 and the tubular portion 25. Thus, the downstream fins 18, 19 are not tilted, either.

The cap 76 is made of a material softer than those of the knob body 64 and the lens 74. Therefore, the tactile sensation when the cap 76 is pinched is soft. In addition, at the time of the above-described rotation operation, the cap 76 elastically deforms along the shapes of the fingers to increase the contact area with the fingers. This prevents slipping and thus facilitates the operation.

In the following description, it is assumed that the shut-off damper 40 is arranged at the open position.

FIGS. 5 and 6 illustrate the air-conditioning register when the downstream fins 18, 19 are in the neutral state, and all the upstream fins 28, 29 are also in the neutral state. At this time, the downstream fins 18, 19 are substantially parallel with the lateral walls 15. The upstream fins 28, 29 are substantially parallel with the vertical walls 14. Accordingly, after passing through the shut-off damper 40, the air-conditioning air A1 flows along the upstream fins 28, 29 and the vertical walls 14, then flows along the downstream fins 18, 19 and the lateral walls 15 to be blown out straight from the outlet 16.

When an upward force or a downward force is applied to the operation knob 55 in the neutral state, the upper downstream fin 18 is tilted about the downstream fin pivots 21. The tilting motion is transmitted to the downstream fins 19 via the link mechanism LM1 (refer to FIG. 6). This tilts the lower downstream fin 19 in the direction in which the operation knob 55 is operated in synchronization with the upper downstream fin 18. When flowing along the tilted downstream fins 18, 19 as described above, the air-conditioning air A1 changes its direction and blows out obliquely upward or downward from the outlet 16.

The tilting motion of the operation knob 55 is transmitted to the transmission shaft 101 via the downstream-side Cardan joint J1. Therefore, the transmission shaft 101 swings upward or downward about the pivots 106 of the outer cylinder member 105, which are engaged with the damper plates 41, 46. However, the swinging motion of the transmission shaft 101 is not transmitted to the upstream fins 28, 29. This is because the contactor 102 of the transmission shaft 101 moves in the transmission hole 37 in accordance with the swinging motion, so that no force is transmitted between the contactor 102 and the transmission portion 36. The upper and lower inner wall surfaces of the transmission hole 37 contact neither the contactor 102 nor the portion of the transmission shaft 101 different from the contactor 102. As a result, none of the upstream fins 28, 29 are tilted.

When a leftward force or a rightward force is applied to the operation knob 55 in the neutral state, the operation knob 55 is slid in that direction together with the downstream-side Cardan joint J1. This swings the transmission shaft 101 in the same direction about the upstream end portion.

The swinging motion of the transmission shaft 101 is transmitted to the lateral coupling rod 35. This is because the contactor 102 of the transmission shaft 101 contacts one of the left and right inner wall surfaces of the transmission hole 37 in the transmission portion 36 in accordance with the swinging motion, and force is transmitted between the contactor 102 and the transmission portion 36. This moves the transmission portion 36 leftward or rightward together with the other parts of the lateral coupling rod 35. This motion is transmitted to the upstream fins 28, 29. As a result, the upstream fins 28, 29 are tilted leftward or rightward about the upstream fin pivots 31. When flowing along the tilted upstream fins 28, 29 as described above, the air-conditioning air A1 changes its direction and blows out leftward or rightward from the outlet 16.

The above is the operation when the operation knob 55 is tilted or slid from a referential state, in which the upstream fins 28, 29 and the downstream fins 18, 19 are in the neutral state. However, when the operation knob 55 is tilted or slid from a state different from the neutral state, the respective parts of the air-conditioning register operate in the same manner as described above. Further, the cap 76 can be rotated to tilt the shut-off damper 40 even if the upstream fins 28, 29 are inclined with respect to the vertical walls 14, or even if the downstream fins 18, 19 are inclined with respect to the lateral walls 15.

The operation of moving the operation knob 55 in the vertical direction or sliding the operation knob 55 in the lateral direction as described above is performed by pinching the cap 76 in the same manner as in the above-described rotation operation. Since the cap 76 is made of a soft material, the tactile sensation when the cap 76 is pinched is soft. Even in this case, the cap 76 elastically deforms along the shapes of the fingers to increase the contact area with the fingers. This prevents slipping and thus facilitates the operation.

As described above, by operating the operation knob 55, the downstream fins 18, 19, the upstream fins 28, 29, and the shut-off damper 40 can be tilted independently.

In the air-conditioning register of the present embodiment, the light emitting portion 84 emits light when power is wirelessly supplied from the power supplying portion 91 of the decorative panel 12 to the power receiving portion 85 of the operation knob 55 by the direct current resonance method. The light irradiated from the light emitting portion 84 passes through the lens 74 and illuminates the surroundings.

When the operation knob 55 is moved in the lateral direction or the vertical direction to change the direction in which the air-conditioning air A1 is blown out, the relative distance and the relative angle between the loop coil 92 of the power supplying portion 91 and the loop coil 87 of the power receiving portion 85 change. This state is achieved by using the region Z2 (the gradual reduction region) in FIG. 14. Accordingly, the power supply efficiency from the power supplying portion 91 to the power receiving portion 85 is changed, so that the luminance is changed.

As shown in FIGS. 10 and 11B, the accommodation space 82, in which the light emitting portion 84 and the power receiving portion 85 are arranged, is surrounded by the knob body 64, the lens 74, and the cap 76, which is attached to the knob body 64 and the lens 74. A path is defined in the gap between the knob body 64 and the cap 76 and in the gap between the cap 76 and the lens 74. To contact the light emitting portion 84 and the power receiving portion 85, the gas outside the operation knob 55 needs to flow into the accommodation space 82 through the path.

However, the cap 76 is made of a material softer than those of the knob body 64 and the lens 74. The inner circumferential portion of the upstream end portion of the cap 76 is pressed against the outer circumferential portion of the knob body 64 while being elastically deformed. Therefore, the gap between the inner circumferential portion of the upstream end portion of the cap 76 and the outer circumferential portion of the knob body 64 is narrower than that in the case in which the cap 76 is made of a hard material like the knob body 64. In addition, the above-mentioned pressing contact is made in a state in which the inner circumferential portion of the upstream end portion of the cap 76 is engaged with the outer circumferential portion of the knob body 64 by means of the projection-recess relationship. That is, the annular projection 77 (the upstream engaging portion) of the cap 76 is engaged with the annular recess 67 (the upstream engagement portion) of the knob body 64, so that the inner circumferential portion of the upstream end portion of the cap 76 is engaged with the outer circumferential portion of the knob body 64 by means of the projection-recess relationship (see FIG. 12). Therefore, in the portions engaged by means of the projection-recess relationship, the path is longer than that in the case in which the cap 76 and the knob body 64 are engaged without projection-recess relationship. Accordingly, the gas outside the operation knob 55 is unlikely to enter the accommodation space 82 from between the knob body 64 and the cap 76.

In particular, in the present embodiment, the annular projection 77 is provided over the entire circumference of the cap 76, and the annular recess 67 is provided over the entire circumference of the knob body 64. This allows the path for gas to be lengthened over the entire circumference of the cap 76 and the knob body 64. The degree of sealing of the accommodation space 82 is increased, accordingly. The gas outside the operation knob 55 is thus unlikely to enter the accommodation space 82 from between the knob body 64 and the cap 76 at any position in the circumferential direction.

The inner circumferential portion of the downstream end portion of the cap 76 is pressed against the outer circumferential portion of the lens 74 while being elastically deformed. Therefore, the gap between the inner circumferential portion of the downstream end portion of the cap 76 and the outer circumferential portion of the lens 74 is narrower than that in the case in which the cap 76 is made of a hard material like the lens 74. In addition, the above-mentioned pressing contact is made in a state in which the inner circumferential portion of the downstream end portion of the cap 76 is engaged with the outer circumferential portion of the lens 74 by means of the projection-recess relationship. That is, the stepped portion 78 (the downstream engaging portion) of the cap 76 is engaged with the stepped portion 75 (the downstream engagement portion) of the lens 74, so that the inner circumferential portion of the downstream end portion of the cap 76 is engaged with the outer circumferential portion of the lens 74 by means of the projection-recess relationship. Therefore, in the portions engaged by means of the projection-recess relationship, the path is longer than that in the case in which the cap 76 and the lens 74 are engaged without projection-recess relationship. Accordingly, the gas outside the operation knob 55 is unlikely to enter the accommodation space 82 from between the cap 76 and the lens 74.

In particular, in the present embodiment, the stepped portion 78 is provided over the entire circumference of the cap 76, and the stepped portion 75 is provided over the entire circumference of the lens 74. This allows the path for gas to be lengthened over the entire circumference of the cap 76 and the lens 74. The degree of sealing of the accommodation space 82 is increased, accordingly. The gas outside the operation knob 55 is thus unlikely to enter the accommodation space 82 from between the cap 76 and the lens 74 at any position in the circumferential direction.

As a result, the water vapor contained in the air-conditioning air A1 flowing in the airflow passage 13 is less likely to condense on the surface of the light emitting portion 84 or the power receiving portion 85 (condensation). It is possible to suppress the occurrence of corrosion, short circuits, fogging of the lens 74, and the like due to such condensation. Also, if sulfidizing gas contacts the silver in the electronic components constituting the light emitting portion 84 and the power receiving portion 85, the silver reacts with the sulfidizing gas, which adversely affects the light emitting property of the light emitting portion 84. However, in the present embodiment, the airtightness is enhanced as described above. This suppresses the reaction and limit the influence of the sulfidizing gas on the light emitting property of the light emitting portion 84.

Since the diameter of the cap 76 decreases from the upstream end to the downstream end, the cap 76 may fall off the knob body 64 when pulled toward the downstream side. In this regard, the annular projection 77 of the cap 76 is engaged with the annular recess 67 of the knob body 64 as shown in FIG. 12 in the present embodiment. The annular projection 77 projects in a direction intersecting (orthogonal to) the flowing direction of the air-conditioning air A1 (the pulling direction). The annular recess 67 is also recessed in a direction intersecting (orthogonal to) the flowing direction. Thus, the annular projection 77 engaged with the annular recess 67 resists downstream movement. Therefore, even if pulled toward the downstream side, the cap 76 is prevented from coming off the knob body 64.

In addition to the ones listed above, the present embodiment has the following advantages.

As shown in FIG. 1, the downstream fin 18, which is supported by the retainer 10, is a thin plate. It is thus difficult to supply power to the operation knob 55 provided in the downstream fin 18 through wires. In this regard, in the present embodiment, the power supplying portion 91 of the retainer 10 (the decorative panel 12) wirelessly supplies power to the power receiving portion 85 in the operation knob 55. This configuration requires neither feeder lines nor signal lines and thus has an improved aesthetic appearance. Unlike the case of wired connection, problems such as breakage of wires do not occur. The configuration also eliminates the necessity for routing feeder lines and signal lines to avoid breakage of the lines. Furthermore, the power supplying structure is unlikely to hamper the operation of the operation knob 55, allowing the operation knob 55 to be operated as designed.

In the present embodiment, the direct current resonance method is used in the wireless power supplying system. Thus, the power supply efficiency is higher than the electromagnetic induction method in conformity with the Qi standard. Also, the direct current resonance method is capable of allowing the light emitting portion 84 to emit light in wider ranges of the relative distance and the relative angle between the power supplying portion 91 and the power receiving portion 85 than in the case of the electromagnetic induction method. Thus, the arrangement of the power supplying-side loop coil 92 and the power receiving-side loop coil 87 can be highly flexibly determined.

When the light emitting portion 84 emits light, the operation knob 55 is conspicuous even in a dark passenger compartment. This allows the occupant to visually check the position of the operation knob 55.

Depending on the operation direction of the operation knob 55, the relative distance and the relative angle between the power receiving portion 85 and the power supplying portion 91 change, which changes the illuminance. This allows the light emitting portion 84 to function as ambient lighting.

The above-described embodiment may be modified as follows.

<Engagement of Cap 76>

Contrary to the above-described embodiment, the upstream engaging portion of the cap 76 may be formed by a recess and the upstream engagement portion of the knob body 64 may be formed by a protrusion.

The upstream engaging portion at the upstream end portion of the cap 76 may be provided only in a part in the circumferential direction. Also, the upstream engagement portion of the knob body 64 may be provided only in a part in the circumferential direction. Even this configuration lengthens the gas flow path between the upstream engaging portion and the upstream engagement portion, thereby limiting the entry of gas into the accommodation space 82.

The downstream engaging portion at the downstream end portion of the cap 76 may be provided only in a part in the circumferential direction. Also, the downstream engagement portion of the lens 74 may be provided only in a part in the circumferential direction. Even this configuration lengthens the gas flow path between the downstream engaging portion and the downstream engagement portion, thereby limiting the entry of gas into the accommodation space 82.

Figure 15:
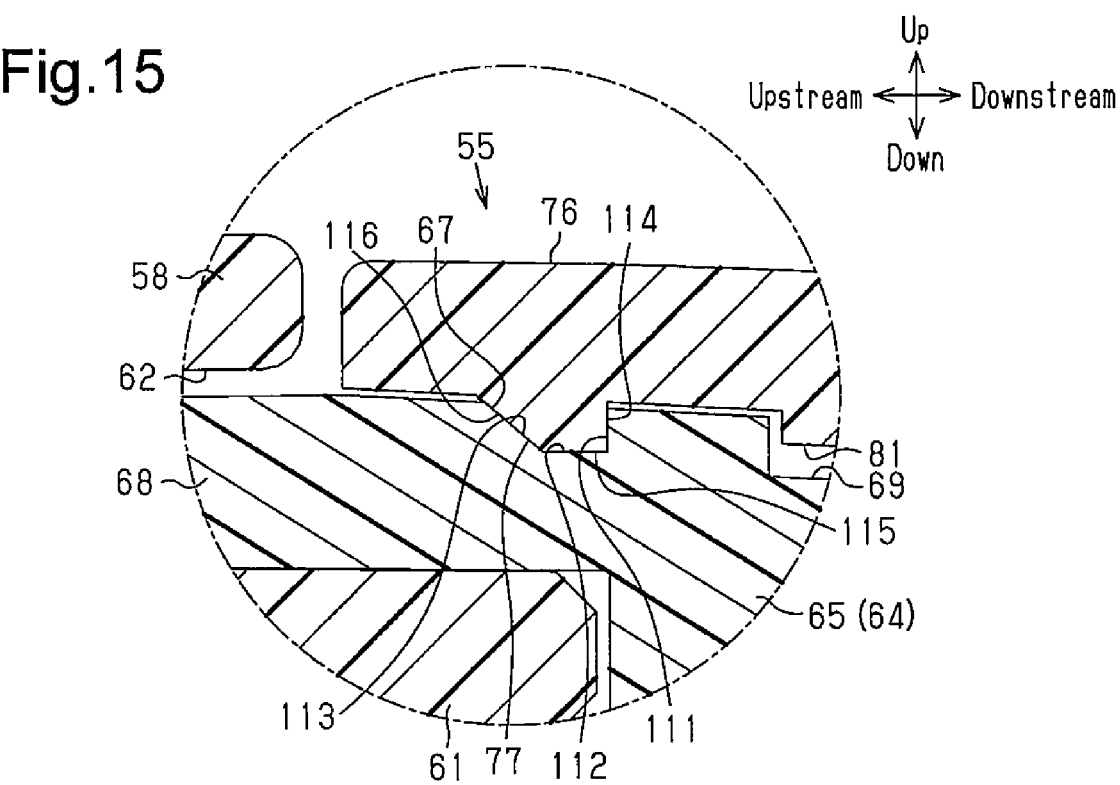
FIG. 15 is an enlarged partial cross-sectional side view illustrating part of the cap that is engaged with the knob body in a modification.

The cross-sectional shape of the annular recess 67 in the knob body 64 may be changed to a shape different from the semicircular shape. FIG. 15 illustrates one example. The annular recess 67 in this modification has an inner downstream wall surface 111, an inner intermediate wall surface 112, and an inner upstream wall surface 113. The inner downstream wall surface 111 is located at the most downstream section of the annular recess 67. The inner downstream wall surface 111 intersects the central axis (not shown) of the knob body 64 at a right angle or a substantially right angle. The inner intermediate wall surface 112 is adjacent to and on the upstream side of the inner downstream wall surface 111. The inner intermediate wall surface 112 extends parallel or substantially parallel with the central axis. The inner upstream wall surface 113 is adjacent to and on the upstream side of the inner intermediate wall surface 112. The inner upstream wall surface 113 is inclined such that the distance from the central axis increases toward the upstream side and is connected to the outer circumferential surface of the lens holding portion 65.

Along with the above change in the cross-sectional shape of the annular recess 67, the cross-sectional shape of the annular projection 77 of the cap 76 is also changed. The annular projection 77 has an outer downstream wall surface 114, an outer intermediate wall surface 115, and an outer upstream wall surface 116. The outer downstream wall surface 114 is located at the most downstream section of the annular projection 77. The outer downstream wall surface 114 intersects the central axis (not shown) of the cap 76 at a right angle or a substantially right angle. The outer intermediate wall surface 115 is adjacent to and on the upstream side of the outer downstream wall surface 114. The outer intermediate wall surface 115 extends parallel or substantially parallel with the central axis. The outer upstream wall surface 116 is adjacent to and on the upstream side of the outer intermediate wall surface 115. The outer upstream wall surface 116 is inclined such that the distance from the central axis increases toward the upstream side and is connected to the inner circumferential surface of the cap 76.

With the above modification, when the annular projection 77 is engaged with the annular recess 67, the outer downstream wall surface 114 contacts the inner downstream wall surface 111, the outer intermediate wall surface 115 contacts the inner intermediate wall surface 112, and the outer upstream wall surface 116 contacts the inner upstream wall surface 113. In at least one of these contacting portions, the contact is made in a pressing state.

As described above, the outer upstream wall surface 116 of the annular projection 77 is inclined such that the distance from the central axis increases toward the upstream side. Therefore, when engaging the annular projection 77 with the annular recess 67, it is easy to place the cap 76 over the knob body 64. In addition, since the inner downstream wall surface 111 and the outer downstream wall surface 114 intersect the central axis at a right angle or a substantially right angle, the inner downstream wall surface 111 restricts the annular projection 77 from moving further downstream in a state in which the annular projection 77 is engaged with the annular recess 67. Therefore, even if the cap 76 is pulled toward the downstream side, the cap 76 is more unlikely to come off the knob body 64.

<Wireless Power Supply>

Two or more power supplying portions 91 may be provided at different positions in the decorative panel 12.

The light emitting portion 84 may be turned on in conjunction with the headlights being turned on. That is, when the headlights are turned on, the vehicle battery 93 may supply power to the power supplying portion 91.

The number of turns of the loop coil 92 may be set to be more than one.

The configuration of the power supplying-side resonance circuit and the power receiving-side resonance circuit may be different from that illustrated in FIG. 13. For example, a capacitor may be provided in parallel with each of the loop coils 87 and 92 and may function as a power storage portion.

As the wireless power supply, a system different from the direct current resonance method, for example, an electromagnetic induction method may be employed.

<Blow Regulating Portion>

The shut-off damper 40 may be configured by a single damper plate.

The number of the downstream fins 18, 19 and the number of the upstream fins 28, 29 may be changed to numbers different from those in the above-described embodiment.

The main portions of the downstream fins 18, 19 may be constituted by plate-shaped members that extend in the vertical direction and the flowing direction of the air-conditioning air A1 in the airflow passage 13. Also, the main portions of the upstream fins 28, 29 may be constituted by plate-shaped members that extend in the lateral direction and the flowing direction of the air-conditioning air A1 in the airflow passage 13.

The blow regulating portion may be constituted by one or two types of the downstream fins 18, 19, the upstream fins 28, 29, and the shut-off damper 40.

<Other Modifications>

The downstream-side Cardan joint J1 may have any configuration as long as the knob body 64 and the transmission shaft 101 are coupled to each other in such a manner that the intersecting angle of the axes can be changed freely. Thus, in addition to the universal joint as described above, a different type of a joint, for example, a ball joint may be employed as the downstream-side Cardan joint J1.

The air-conditioning register may be provided at a location in the passenger compartment other than the instrument panel.

As long as the above-described air-conditioning register is capable of adjusting the state of the air-conditioning air A1 blown out of the outlet 16 by operating the blow regulating portion in accordance with manipulation of the operation knob 55, the air-conditioning register does not necessarily need to be used in vehicles but is applicable to wide variety of usages.

The invention claimed is:

1. An air-conditioning register comprising:
a retainer having an airflow passage, wherein the airflow passage has an outlet at a downstream end portion in a flowing direction of air-conditioning air;
an operation knob, which is operably arranged at the outlet; and
a blow regulating portion, which is arranged in the airflow passage, wherein the blow regulating portion operates in correspondence with operation of the operation knob, thereby regulating a state of the air-conditioning air, which is blown out from the outlet, wherein
the operation knob includes
a light emitting portion, and
a power receiving portion, which is connected to the light emitting portion,
the retainer includes a power supplying portion, which wirelessly supplies power to the power receiving portion,
the operation knob further includes
a knob body having a closed end, wherein a downstream end portion in the flowing direction of the knob body is open, and
a cap, in which an upstream end portion in the flowing direction is open and a downstream end portion is closed by a lens,
the light emitting portion and the power receiving portion are arranged in an accommodation space surrounded by the knob body, the cap, and the lens,
the cap is made of a material softer than those of the knob body and the lens,
an inner circumferential portion of the upstream end portion of the cap is pressed against an outer circumferential portion of the knob body with at least a part engaged with the outer circumferential portion of the knob body by means of a projection-recess relationship, and
an inner circumferential portion of the downstream end portion of the cap is pressed against an outer circumferential portion of the lens with at least a part engaged with the outer circumferential portion of the lens by means of a projection-recess relationship.

2. The air-conditioning register according to claim 1, wherein
the cap has an upstream engaging portion at least in a part in a circumferential direction of the inner circumferential portion of the upstream end portion,
the knob body has an upstream engagement portion, with which the upstream engaging portion is engaged, at least in a part in a circumferential direction of the outer circumferential portion, and
one of the upstream engaging portion and the upstream engagement portion is constituted by a projection and the other is constituted by a recess.

3. The air-conditioning register according to claim 2, wherein
the upstream engaging portion is provided over the entire inner circumferential portion of the upstream end portion of the cap, and
the upstream engagement portion is provided over the entire outer circumferential portion of the knob body.

4. The air-conditioning register according to claim 1, wherein
the cap has a downstream engaging portion at least in a part in a circumferential direction of the inner circumferential portion of the downstream end portion,
the lens has a downstream engagement portion, with which the downstream engaging portion is engaged, at least in a part in a circumferential direction of the outer circumferential portion, and
the downstream engaging portion and the downstream engagement portion are constituted by stepped portions, which are capable of being engaged with each other.

5. The air-conditioning register according to claim 4, wherein
the downstream engaging portion is provided over the entire inner circumferential portion of the downstream end portion of the cap, and
the downstream engagement portion is provided over the entire outer circumferential portion of the lens.

6. The air-conditioning register according to claim 1, wherein
the operation knob further includes a mounting base,
the knob body is supported to be rotational relative to the mounting base, and
the cap is attached to the knob body such that the cap and the knob body rotate integrally.

* * * * *